2 Sheets—Sheet 1.

T. SWEENEY, dec'd.,

F. A. OSBORN, Trustee of THE SWEENEY WATER METER ASSOCIATION, Assignee by mesne assignments.

Water Meter.

No. 9,379. Reissued Sept. 14, 1880.

Witnesses.
Jo. E. Lodge.
Louis A. Curt

Francis A. Osborn,
Trustee of the
Sweeney Water Meter Association,
By Frederick Curtis, Atty.

2 Sheets—Sheet 2.

T. SWEENEY, dec'd.,

F. A. OSBORN, Trustee of THE SWEENEY WATER METER ASSOCIATION, Assignee by mesne assignment Water Meter.

No. 9,379. Reissued Sept. 14, 1880.

*Witnesses.*
*H. E. Lodge.*
*Louis H. Curtis.*

*Francis A. Osborn,*
*Trustee of the*
*Sweeney Water Meter Association.*
*By Frederick Curtis, Atty.*

UNITED STATES PATENT OFFICE.

FRANCIS A. OSBORN, OF BOSTON, MASSACHUSETTS, TRUSTEE OF THE SWEENEY WATER METER ASSOCIATION, ASSIGNEE, BY MESNE ASSIGNMENTS, OF THOMAS SWEENEY, DECEASED.

WATER-METER.

SPECIFICATION forming part of Reissued Letters Patent No. 9,379, dated September 14, 1880.

Original No. 101,059, dated March 22, 1870. Application for reissue filed June 23, 1880.

*To all whom it may concern:*

Be it known that THOMAS SWEENEY, of Boston, Massachusetts, (now deceased,) did, during his lifetime, invent certain new and useful Improvements in Water-Meters, of which the following is a specification.

This invention relates to a water-meter of the kind known as a "reciprocating piston-meter"—that is to say, one in which the water is expelled alternately from the two chambers formed, one at each end of the meter, between one of the heads of the meter and the adjoining head of the reciprocating piston.

The invention consists in the employment within one and the same piston of two separate and independent valves provided with ports communicating with passages in the piston in such manner that the said valves shall reciprocate intermittently in the same direction with each other, the one—which may be termed the "main" valve, and which governs the inflow and outflow of the water by which the piston is caused to move—being moved by the pressure of water acting alternately on its ends, and the other—which may be termed the "auxiliary" valve, and which governs the admission of water to the ends of the main valve—being moved or shifted by the impact of its ends against the heads of the meter.

The invention also consists in a reciprocating piston formed with seats for main and auxiliary valves, and with induction and eduction chambers leading to the inlet and outlet passages, respectively, of the shell or case of the meter, and communicating, the former with the inlet-ports of the two valves and the latter with the exhaust-ports of said valves.

The invention further consists in details of construction and arrangement of the various parts of the meter, which will be hereinafter pointed out.

Figure 1:
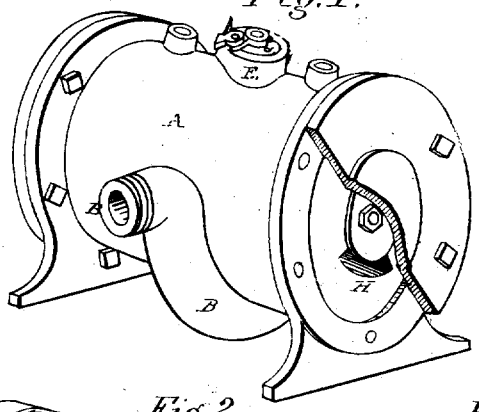
Figure 2:
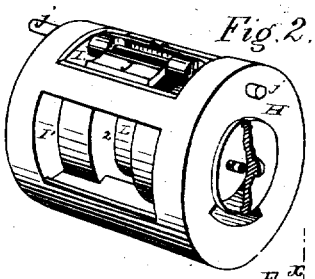
Figure 3:
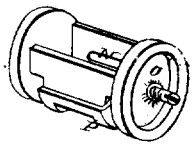
Figure 4:
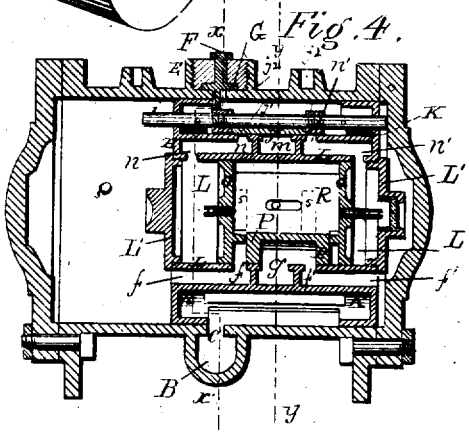
Figure 5:
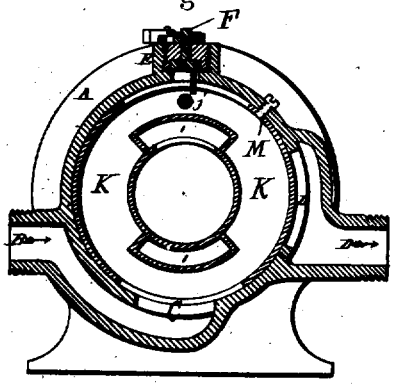
Figure 7:
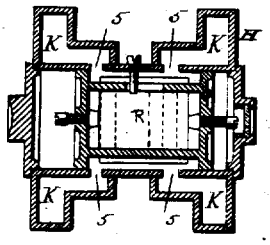
Figure 6:
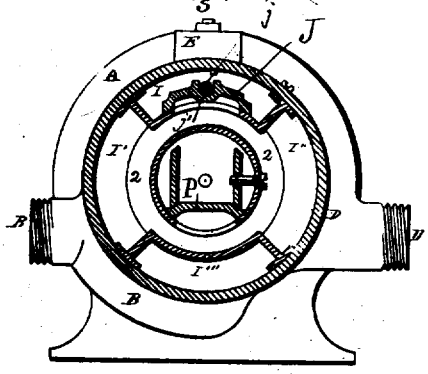
Figure 8:
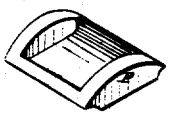

In the drawings accompanying this specification, Figure 1 is a perspective view of my improved meter, one of the heads being partly broken away to show the head of the inclosed main piston. Fig. 2 is a perspective view of the main piston detached. Fig. 3 is a perspective view of the small inner piston, one end of which is shown in place in Fig. 2, the head of the main piston being partly broken away for this purpose. Fig. 4 is a longitudinal vertical section of the whole apparatus. Fig. 5 is a cross-section on line *x x* of Fig. 4, the plane of section passing longitudinally and axially through the central boss or seat in auxiliary D, valve J, which contains the valve-rod *j*. Fig. 6 is a cross-section on line *y y* of Fig. 4. Fig. 7 is a central horizontal section through the main piston, and Fig. 8 is a view of the under side of the valve in the inner piston.

A is the outer shell or cylindrical case, cast or formed integral with an inlet tube or passage, B, at one side, which passes down outside the cylinder and communicates with the inside of the case by a port, C, in its bottom, in a direction at right angles to the line at which the water enters B.

At the side directly opposite the inlet is the outlet-port D, leading to the exhaust-pipe. These ports and passages are cast integral with the cylinder, as is also the tubular chamber E, for the reception of the rock-shaft F and piston head or collar G, which impart the movements to the dial-indicator. (Not necessary to be shown.)

H is the reciprocating piston, which, with the exception of its heads and inner walls, is cast integral, including its chambers I and ports and passages. There are four chambers, the top one, I, of which contains the sliding concave valve J, and also communicates, by four passages, K K, with the bottom chamber, I‴, two of these passages being at one end and two at the other end of said top and bottom chambers. The other two chambers, I′ I″, are at the sides, and communicate with the passages 2, Fig. 2. The chambers I I‴ are virtually one, and communicate with the various induction ports and passages. The chambers I′ I″ are virtually one, and communicate with the various exhaust ports and passages of the meter. This main piston is lined centrally with a metal tube or cylinder, L, which is closed at its ends by heads L′. The said closed cylinder forms a seat for a reciprocating piston-valve, O, whose D-valve P registers with inlet-ports *f f′* and central exhaust-ports, *g*, formed in cylinder L.

The piston-valve O is of skeleton formation, as shown, consisting of two heads connected by side bars and provided with the valve proper, P. The space R, between its two heads, is at all times filled with water, which enters it through the slots 5 in the valve-seat L, which slots lead into the passages K.

Owing to the skeleton form of the piston O water from the space R will pass freely through port *f* or *f'*, according as one or the other is uncovered by the valve P, and thence enters between the adjoining head of the main piston and the head of the case, thus forcing the main piston to move in the other direction, the water at the other end of the meter being discharged through the other port, which is in communication, through the valve D, with the central exhaust-port, *g*, the latter port communicating, as shown, through passages 2, with the eduction chamber or chambers I' I''.

In order to give to the piston-valve O the reciprocating movement needed in order to operate the main piston, I admit water under pressure alternately to each end of the cylinder L through end passages, *n n'*, which communicate with inlet-ports in the upper induction-chamber, I, controlled by the auxiliary slide-valve J. This valve, which is here shown as provided with an acting face of concave form, is a D-valve working on a seat properly formed for it in the main piston over the inlet-ports *n n'* and intermediate exhaust-port, *m*.

The valve is held in position by the rod *j*, which is joined to the valve (being contained in a boss or seat, *j'*, extending longitudinally and centrally of the valve-cavity, as shown in Fig. 6, and held from endwise movement therein by end nuts, $j^2$, Fig. 4) and has its ends working in and projecting at each end out beyond the heads of the main piston. By this arrangement, just as the main piston is about to complete its stroke in either direction, the projecting end of the auxiliary valve-rod *j* on that side of the piston will abut against the head of the meter-case, and so cause the auxiliary valve to shift.

The exhaust-passage *m* communicates, through passage 2, with the outlet-chamber I' or I''. Water admitted alternately through *n n'* will cause the main valve to reciprocate, the water at the other end escaping through exhaust-port *m*.

The main piston H has a longitudinal slot or groove at M, to receive a guide-pin projecting through the shell, to allow the piston to reciprocate without rotating. For the same purpose the main valve is also provided with a slot, N, and guide-pin.

The operation is as follows, supposing the parts to be in the position shown in Fig. 4: Water under pressure entering the inlet-pipe B passes, through opening C, into the lower part, I''', of the induction-chamber in piston H; thence passing up through passages K, filling, in its way, the inside R of the main valve O, through openings 5, it enters and fills the upper chamber, I, going around both sides of the piston in its ascent. From the upper chamber, I, it passes through the open port *n'* into the right-hand end of cylinder L, thus forcing the valve O to the left, the water in the left end of cylinder L discharging through port *n* and exhaust-port *m*. The main valve thus having shifted, the port *f'* will be thrown into communication with the water-space R, and water will flow through said port into the right-hand end of the meter-case, between the head of the case at that end and the adjoining head of the piston. The piston will now move to the left, the water in the space Q, at the left of the case, discharging through port *f*, which, now that the valve O has shifted, is in communication with the exhaust-port *g*. The piston will thus continue to move until near the end of its stroke, at which time the projecting end *j* of the auxiliary valve, bringing up against the head of the meter-case, will cause said valve to shift, thus reversing the movement, and so on.

Thus it will be seen that of the three active instrumentalities in this meter, two—viz., the auxiliary valve and the main valve—are mounted in and carried by the piston. The main water-flow, by which the piston is actuated, is controlled and directed by the main valve, while the auxiliary valve controls that portion of the water diverted from the main body for the purpose of actuating the main valve, the movement of said auxiliary valve being caused by the positive impact or pushing of its ends against the meter case or shell.

What is claimed as the invention of the said THOMAS SWEENEY is as follows:

1. The main piston formed with seats for the main and auxiliary valves and with induction and eduction chambers, communicating, the former with the valve-inlet ports and the latter with the valve-exhaust ports, substantially as hereinbefore set forth.

2. The hollow main or piston valve mounted in the main piston in a cylindrical seat or chamber closed at the ends, but provided in the side with openings through which induction-water is constantly admitted to the space within said valve between its heads, substantially as set forth.

3. In combination with the main piston and the meter case or shell, the hollow main or piston valve mounted in a cylindrical seat in said piston, provided with openings admitting water to the interior of the valve and with inlet and exhaust ports or passages controlled by said valve, to alternately admit and exhaust water to and from each end of the meter case or shell, substantially as hereinbefore set forth.

4. The combination of the meter case or shell, the reciprocating main piston, the main or piston valve carried by and controlling the movements of the piston, the auxiliary valve carried by the piston and controlling the movement of the main valve and operated by impact against or contact with the cylinder case or shell, and inlet and exhaust ports or passages for alternately admitting and exhausting water to and from the ends of the cylinder in which the piston and the main valve are seated, the combination being and having the mode of operation substantially as hereinbefore set forth.

5. The combination, with the piston, of the main and auxiliary valves, the valve seats or chambers, and the induction and eduction chambers, with their communicating passages and ports, substantially as set forth.

6. The piston H, having four spaces or depressions on its surface, two of which communicate with the induction-passage and the other two with the eduction-passage, substantially as shown and described.

7. The main piston having ports K K K K, arranged as hereinbefore described, so that the spaces communicating with the induction-passage shall be upon directly-opposite sides of the piston.

8. In combination with the inner piston, the main piston provided with ports K K K K, arranged, substantially as hereinbefore set forth, to communicate with a space, R, between the heads of the inner piston.

9. The special construction shown and described of the main piston H, the same being cast in skeleton form and having projections and divisions on its inner surface, and adapted to receive the tube provided with suitable openings, so that the two united shall constitute a cylinder for the inner piston, and having also upon its inner surface suitable ports or passages through which to supply both pistons and to form eduction-ports for the same.

10. The combination, substantially as hereinbefore set forth, with the main piston, of the concave slide-valve J, arranged in one of the compartments or depressions of the said piston, communicating with the induction-passage, for the purpose of governing the action of the inner piston.

11. In combination with the concave valve J, a valve-rod, *j*, passing through the heads of the piston for the purpose of giving motion to said valve, while the piston is approaching the head of its stroke, by coming in contact with the head of the outer cylinder or shell.

FRANCIS A. OSBORN,
*Trustee of the Sweeney Water Meter Association.*

Witnesses:
WM. T. ANDREWS,
H. E. LODGE.